United States Patent [19]

Inoue

[11] 4,301,349
[45] Nov. 17, 1981

[54] ELECTRICAL MACHINING APPARATUS FOR FORMING A THREE-DIMENSIONAL SURFACE CONTOUR IN A WORKPIECE

[75] Inventor: Kiyoshi Inoue, Tokyo, Japan

[73] Assignee: Inoue-Japax Research Incorporated, Yokohama, Japan

[21] Appl. No.: 81,352

[22] Filed: Oct. 3, 1979

[30] Foreign Application Priority Data

Oct. 6, 1978 [JP] Japan ............................... 53-123280
Dec. 14, 1978 [JP] Japan ............................... 53-155569
Jun. 13, 1979 [JP] Japan ............................... 54-75084

[51] Int. Cl.³ .............................................. B23P 1/12
[52] U.S. Cl. ............................. 219/69 W; 219/69 V
[58] Field of Search ................ 219/69 W, 69 M, 69 V

[56] References Cited

U.S. PATENT DOCUMENTS 2,794,110  5/1957  Griffith ............................ 219/69 W

FOREIGN PATENT DOCUMENTS 67186    6/1969  Fed. Rep. of Germany ... 219/69 W
1012420 12/1965  United Kingdom .
507427   4/1976  U.S.S.R. ........................... 219/69 W Primary Examiner—C. C. Shaw
Attorney, Agent, or Firm—Karl F. Ross

[57] ABSTRACT

A multiple-axis milling-, sculpturing- or shaving-type EDM machine removes material from a selected surface portion of a workpiece with a continuous traveling-wire electrode guided at an end portion of a tool head and juxtaposed with the workpiece. The wire is continuously advanced and transported from a supply reel to a takeup reel on the tool head by drive means to continuously renew the active electrode surface at the guide section while a position controller moves the tool head in a scanning manner relatively over the workpiece surface. A high-frequency mechanical vibration is imparted directly or indirectly to the wire electrode carried by the guide section while traveling in juxtaposition with the workpiece.

8 Claims, 11 Drawing Figures

ELECTRICAL MACHINING APPARATUS FOR FORMING A THREE-DIMENSIONAL SURFACE CONTOUR IN A WORKPIECE

FIELD OF THE INVENTION

The present invention relates generally to electrical machining techniques, viz. electrical discharge machining (EDM), electrochemical machining (ECM) and electrochemical-discharge machining (ECDM) and, more particularly, to an electrical machining apparatus for forming a three-dimensional (3D) surface contour in a workpiece or a contour of 3D configuration on a workpiece surface with a traveling-wire electrode.

BACKGROUND OF THE INVENTION

Electrical machining techniques, when applied to the forming of a 3D contour or surface pattern in a workpiece, commonly require a tool electrode three dimensionally shaped to conform to the desired contour or surface pattern. Furthermore, a multiplicity of such electrodes of identical or similar configuration and size must be prepared in order to compensate for the wear which the electrodes or tools suffer during the erosion process or in the interest of minimizing the machining time to achieve the end of a desired machined precision and surface finish. Preparation of such precision formed and multiple electrodes is obviously time consuming and laborious.

OBJECTS OF THE INVENTION

It is, accordingly, a principal object of the present invention to provide an improved electrical machining apparatus of milling, sculpturing or shaving type whereby a 3D contour or surface pattern is readily formed in a workpiece with a wire or the like continuous elongate electrode.

Another object of the invention is to provide a milling, sculpturing or shaping-type electrical machining apparatus which allows formation of a desired 3D contour or surface pattern in a workpiece with an increased efficiency.

SUMMARY OF THE INVENTION

In accordance with the present invention there is provided an electrical machining apparatus of milling, sculpturing or shaving type for forming a 3D surface contour in a workpiece. The apparatus comprises a wire or the like continuous elongate electrode (wire), wire advancing means for axially transporting the wire from supply means to takeup means, a workpiece support for carrying the workpiece, wire guide means carried by a tool head and juxtaposed with the workpiece for positioning the wire transported under tension in a machining relationship with the workpiece, power supply means for electrically energizing the wire and the workpiece to electroerosively more material from the latter and machining feed means for relatively displacing the tool head and the workpiece support so as to cause the wire advanced over the guide means to sweep over a predetermined surface region on the workpiece along a predetermined machining path to form the 3D surface contour therein, the guide means having an electrically conductive grooved wire-guiding surface for receiving the advancing wire so that it is substantially exposed to the juxtaposed workpiece surface.

The guide means comprises one or more (e.g. a plurality of) guide members of rotary or non-rotary type whose wire guiding configuration may be adjustable to variably adjust the length, width and area of the wire runningly juxtaposed in a machining relationship with the workpiece surface.

The machining feed means may comprise first drive means for displacing the tool head toward and away from the workpiece along a Z-axis, second drive means for displacing the workpiece support in a plane along X-axes and Y-axes which are orthogonal to the Z-axis. Preferably, third drive means may be included comprising rotary means for rotating the tool head around the Z-axis so that the direction of transverse advance of the wire may always lie perpendicular or, generally with a predetermined angle, to the surface being machined in the workpiece. In a typical shaving operation the second and third drive means are used while milling and sculpturing operations generally require all of the first, second and third drive means to be operated in conjunction with one another. A conventional numerical controller is used to operate the drive to cause the tool head to sweep over the workpiece surface under a program preset to correspond to a desired sweeping path.

Additionally fourth drive means may be incorporated to allow a tilt of the tool head with a variable angle relative to the workpiece so that the tool head and the workpiece are relatively displaced with five degrees of freedom.

In accordance with a further important feature of the present invention, means is provided for imparting a high-frequency vibration in a sonic or ultrasonic range directly or indirectly, e.g., through a machining medium, to the wire advanced through the guide means in juxtaposition with the workpiece. The vibration may be provided by means of an electrochemical transducer or magnetostrictive element but, advantageously, may be induced in response to machining electrical pulses applied across the machining gap between the wire and the workpiece. Specifically a resonant circuit is connected to the machining gap, whose resonant frequency is in tune with the frequency of electrical oscillation generated at the machining gap.

SPECIFIC DESCRIPTION

Figure 1:
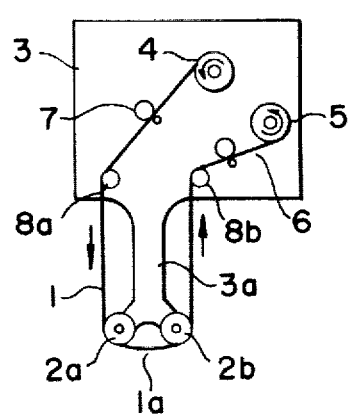
FIG. 1 is an elevational view diagrammatically illustrating a tool head including wire guide means in accordance with the present invention.

In FIG. 1 there is shown a wire or the like elongate continuous electrode 1 (hereinafter referred to as a "wire" or "wire electrode") composed of copper, brass or the like material utilized in conventional traveling-wire or wire-cut electrical discharge machines and having a thickness of 0.05 to 1 mm. The wire 1 is supported over a pair of electrically nonconductive rollers 2a and 2b to form a stretch 1a arranged at a projected end portion 3a of a tool head 3 which carried a wire supply reel 4 and a takeup reel 5 as shown and also has drive rollers 6 and brake rollers 7 mounted thereon together with auxiliary guide rollers 8a and 8b. The drive and brake rollers 6 and 7 are driven to cause the wire 1 to be unwound from the supply reel 4 and wound onto the takeup reel 5 and, in the path therebetween including a U-shaped path over the machining guide rollers 2a and 2b, to continuously travel at a predetermined rate under a suitable tension. Although not shown, the rollers 2a and 2b constituting wire guide means for machining purposes are each formed with a wire reception groove on the periphery thereof of such a depth and width that the substantial portion of the wire 1 may be exposed. As the wire 1 is driven carried in the grooves, the rollers 2a and 2b are rotated.

Figure 2:
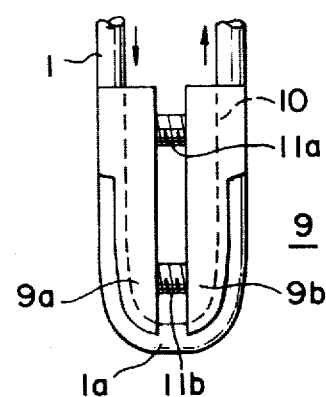
FIG. 2 is an enlarged elevational view diagrammatically illustrating another form of the wire guide means according to the invention.
Figure 3:
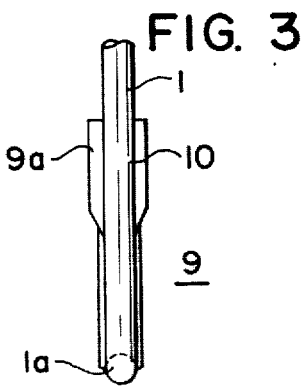
FIG. 3 is a side view of the wire guide means of FIG. 2.

FIGS. 2 and 3 show another form of machining wire guide means 9 for positioning the traveling wire 1 in the U-shaped configuration at the projected end portion of the tool head 3. In this embodiment, the guide member 9 comprises a pair of segments 9a and 9b secured to the tool-head end 3a and having wire reception grooves 10 on their respective outer surfaces composed of an electrically nonconductive, wear-resistant material, e.g. sapphire, through which the wire 1 slidably passes. In this case, the wire 1 when driven moves, therefore, slidingly in the nnconductive guide grooves 10. The guide segments 9a and 9b as shown are coupled together by a screw arrangement 11 whose adjustment provides a change in the width or area of the wire 1a at the tip of the U-shaped travel path that can be juxtaposed in a machining relatinship with a workpiece as desired.

Figure 4:
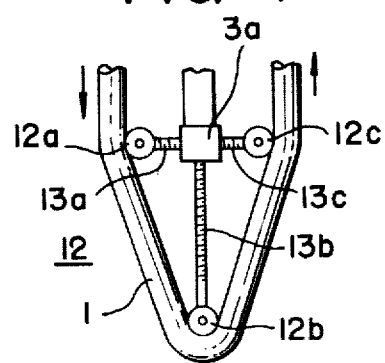
FIG. 4 is an elevational view diagrammatically illustrating a further form of the wire guide portion in accordance with the present invention.

FIG. 4 shows yet another form of machining wire guide means 12 comprising three rollers 12a, 12b and 12c for guiding the wire 1 along a U-shaped path with a narrowed end portion or a V-shaped path of travel with a rounded end. The guide rollers 12a, 12b and 12c are carried by the end 3a of the tool head 3 via respective support screws 13a, 13b and 13c which are adjustable to variably adjust the configuration of wire-travel path determined by the positions of the rollers 12a, 12b and 12c. As are the rollers 2a and 2b in FIG. 1, the roller 12b at the lower end of the assembly 12 is formed on its periphery with a nonconductive grooved surface with such a depth and width as to enable the wire 1 to be exposed in its substantial portion as the latter is carried therewith.

Figure 5:
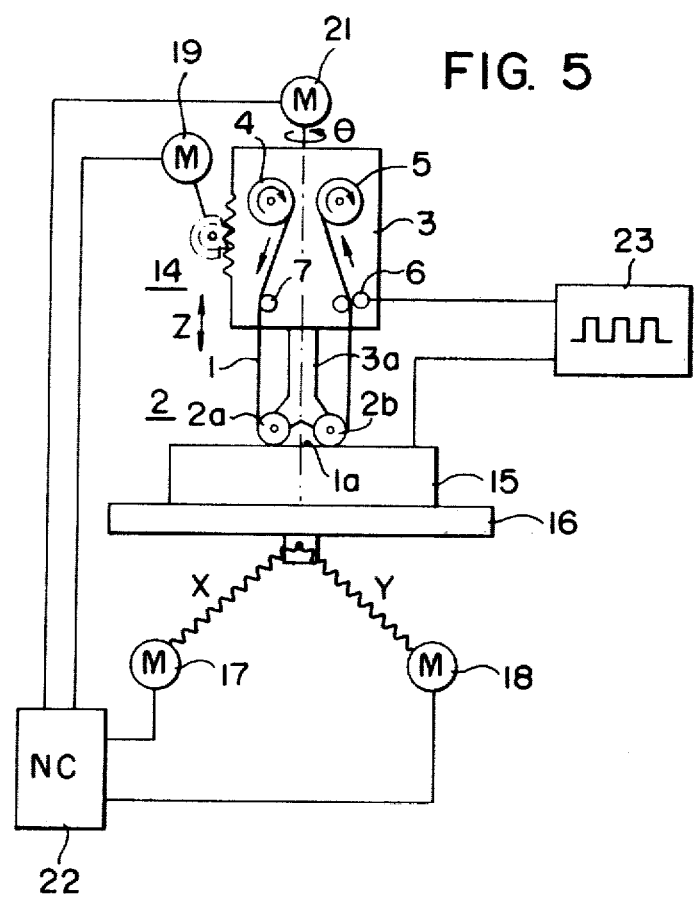
FIG. 5 is a general view, partly elevational, partly in section and also in block forms, of an apparatus embodying the present invention, including a tool head having wire guide means constituted by a pair of rotary guide rollers of FIG. 1.

Referring now to FIG. 5, a tool assembly 14 comprising the tool head 3 carrying the supply reel 4, takeup reel 5, drive rollers 6 and brake rollers 7 (and generally also guide rollers 8 not shown FIG. 5) constituting the wire-advancing system and the machining guide rollers 2a and 2b arranged at the projected end portion 3a of the tool head 3 is shown juxtaposed with a workpiece 15 fixedly mounted on a worktable 16. The latter is, in a usual manner, driven in a horizontal plane by a crossfeed drive arrangement with a first motor 17 for displacing the worktable 15 along an X-axis and a second motor 18 for displacing the worktable 15 along a Y-axis orthogonal to the X-axis.

The tool assembly 14 is driven vertially along a Z-axis by a motor 19 and rotatably about the vertical or Z-axis with an angular displacement $\theta$ by a further motor 21. The axis of rotation of the tool head 3 is shown lying perpendicular or orthogonal to the axis of the wire 1 supported by the guide rollers 2a and 2b in the region of the workpiece 15.

The four motors 17, 18, 19 and 21 as shown are driven in response to respective streams of command pulses from a numerical controller (NC) unit 22 which may be of conventional design.

A power supply 23 adapted to furnish machining energy is connected on one hand to the workpiece 15 and on the other to the wire electrode 1 via a brush provided in the path of the wire 1 at one or more of wire transporting guide rollers on the head 3 but shown connected at the drive rollers 6. As described previously, the machining guide rollers 2a and 2b are composed of an electrically nonconductive material at least on their surface areas contacting the wire 1 so that no leakage current may be conducted away by the rollers 2a and 2b in the region of the workpiece 15.

The power supply 23 may be adapted to furnish a unidirectional current for electrochemical machining (ECM) or a series of electrical pulses for electrical discharge machining (EDM), electrochemical-discharge machining (ECDM) or for ECM, the processes generally referred to electrical or electroerosive machining. As far as material removal is concerned, the term "electroerosive" or "electroerosively" is used generally herein in conjunction therewith in spite of the fact, therefore, that different machining principles may be selectively utilized.

Although not shown, a suitable fluid supply unit is also provided to furnish a machining medium, i.e. liquid dielectric or electrolyte, in the region of the machining gap formed between the workpiece 15 and the wire electrode 1a supported over the guide rollers 2a and 2b.

In operation, the wire 1 continuously advanced from the supply side 4, 7 to the takeup side 5, 6 provides in the region of the end 3a of the tool head 3 a continuously renewed machining electrode surface with an area defined by the distance between the guide rollers 2a and 2b to electroerosively remove material from the surface region of the workpiece 15 that is adjacent or directly opposed thereto. The motor 19 may be driven to advance the head 3 downwardly along the Z-axis as material removal proceeds until a desired machining depth or thickness is reached in the workpiece 15, whereupon the worktable 16 is displaced by the operation of the X-axis motor 17 and the Y-axis motor 18 so that the stretch of the wire 1a between the guides 2a and 2b is shifted laterally with respect to the workpiece 15 to continue material removal.

While the worktable 16 is being displaced in the X-Y plane, the rotary drive motor 16 may simultaneously be driven to angularly displace the tool head 3 along the angular coordinate $\theta$ about the Z-axis intersecting the stretch of the wire 1 between the guides 2a and 2b at the center thereof or which extends generally orthogonal to the X-Y plane so that the direction of lateral displacement may always lie perpendicular to the machining stretch of the wire electrode 1.

Sequential machining blocks defining a surface contour or pattern to be formed on the workpiece 15 are therefore defined by a corresponding series of X-axis, Y-axis, Z-axis and θ-axis displacements in combination which are stored in the numerical controller 22 in the form of a predetermined program. By permitting the motors 17, 18, 19 and 21 to be driven with command pulses furnished by the numerical controller in accordance therewith to perform the respective axial feeds in each of the sequential blocks, the desired surface contour or pattern is generated on the workpiece surface 15.

Although not shown, the tool head assembly 14 may additionally be provided with a fifth axis (φ) drive means for tilting or angularly displacing the head 3 through a variable angle φ with respect to the Z-axis to enable the stretch of the wire 1 at the guide 2a, 2b to be inclined with angle $(\pi/2 - \phi)$ with respect to the horizontal or X-Y plane.

The thickness of the wire 1 is generally in the range between 0.05 mm and 1 mm as mentioned previously and typically ranges upward of 0.1 mm. For example, wire electrodes of 0.2 mm and 0.3 mm in diameter are capable of carrying an average machining current of 7 amperes and 16 amperes, respectively, in an EDM operation utilizing water as a machining medium, which allows a removal rate of 0.33 gram/min and a surface roughness of 12 μRmax to be attained with a stability of the process when the wire is transported at a rate of travel, say, of 3.5 meters/min.

Figure 6:
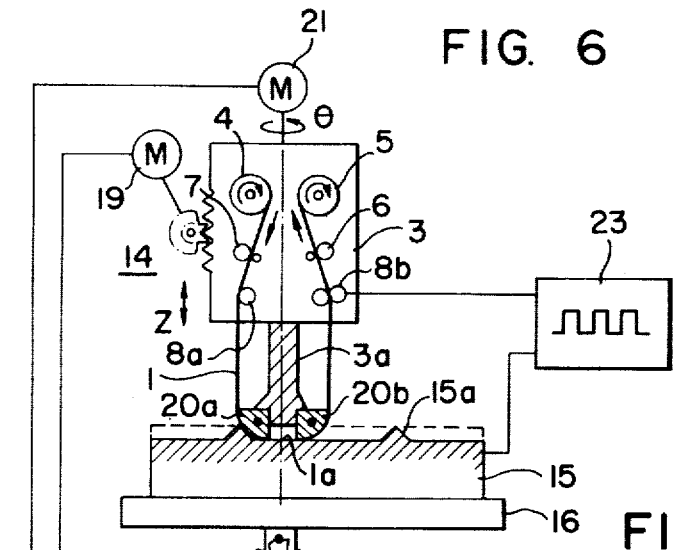
FIG. 6 is a general view of an embodiment of the invention, basically identical to that in FIG. 6, using a pair of guide blocks having sliding guiding surfaces.

In the embodiment shown in FIG. 6, the machining wire guide 2 carried by the tool head 3 comprises a pair of quartered-disk members 20a and 20b spacedly mounted securely to the two corners of the end 3a, respectively and having each a grooved electrically nonconductive surface on their periphery as in the previous embodiments for receptively and slidingly guiding the wire 1 transported along the U-shaped path. The head assembly 14 in the system driven by the four drive motors 17, 18, 19 and 21 under the command of the numerical controller 22 is shown having accomplished stock removal as shown by braken lines on the workpiece 15 with the output machining current from the power supply 23 applied between the wire electrode 1 and the workpiece 15. In this case, the shaving to yield relatively planar surfaces is handled primarily with the wire 1 traveling between the guide members 20a and 20b and desired protrusions or ridges 15a are obtained using the wire 1 guided over the guiding surfaces of the members 20a and 20b.

Figure 7:
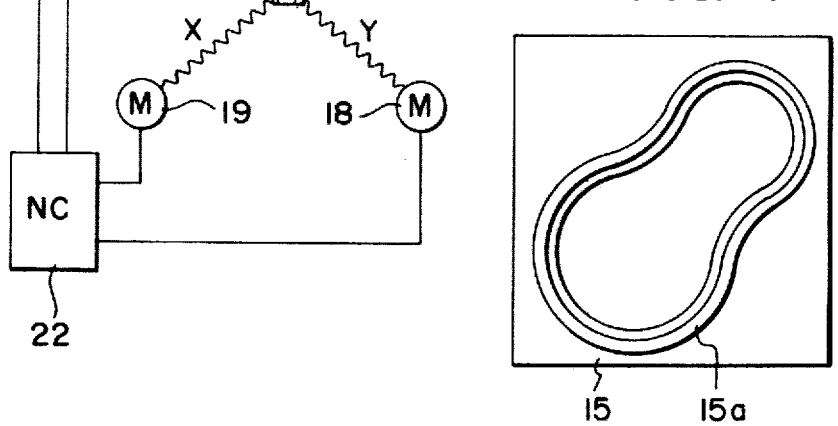
FIG. 7 is a plan view illustrating a pattern formed on the workpiece in accordance with the invention.

FIG. 7 shows a plan view of the machined workpiece 15 with a closed ridge 15a left after shaving thereon in a desired pattern. Such shaving patterns are particularly desirable in forming certain dies and punches with circular or other ridges left thereon which serve to advantageously avoid a breakage of a sheet metal when the latter is punched thereby. Such peculiar patterning can therefore be readily obtained with embodiments of the present invention.

Figure 8:
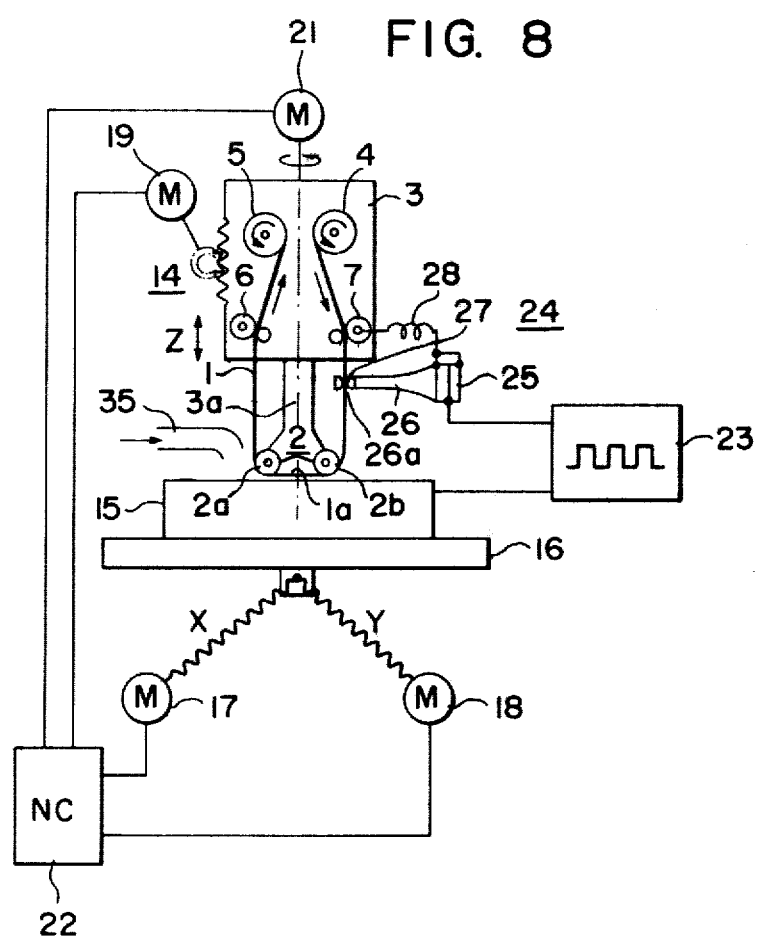
FIG. 8 is a general view, similar to that of FIG. 5 or 6, illustrating a preferred embodiment of the present invention including means for vibrating the traveling wire electrode.

In FIG. 8 there is shown a further preferred embodiment of the present invention in which means 24 for imparting a high-frequency vibration to the wire 1 is provided. The means or vibrator assembly 24 includes a transducer 25 which may be composed of quartz, AlFe, Ni family, cobalt steel, $PbTiO_3$ family, $Pb(TiZr)O_3$ family, Roschelle salt or any of other electrically (piezoelectric), magnetically (magnetostrictive) or electromagnetically vibratable elements. The transducer 25 has a horn 26 coupled thereto which has its end 26a held at a bearing guide 27, in engagement with the wire 1 advanced from the supply side 4 on the tool head 3 toward the machining guide 2 constituted by a pair of rollers 2a and 2b. The high-frequency vibration as induced by the transducer 25 is therefore transmitted to the wire stretch 1a travelling at the region of the machining guide 2.

The transducer 25 may also provide an equivalent capacitance C when electrically connected to the machining gap between the wire 1 and the workpiece 15 and, when an inductance L is present in series or in parallel therewith, may form a resonant circuit.

An inductor 28 is therefore inserted together with the transducer 25 in this embodiment in the circuit connecting the electrical machining power supply 23 with the wire 1 and the workpiece 15. The connection is, as shown, made with the inductor 28 and the capacitor connected in series with the power supply 23 and to one of brake rollers 7 for the wire 1 so that the wire 1 may be effectively heated to increase its straightness prior to arrival to the machining region at the guide 2. The inductance L of inductor 28 is chosen to establish, in conjunction with the effective capacitance C of the transducer 25, a resonant condition with the machining current.

When machining pulses are furnished from the power supply 23 between the wire stretch 1 at the guide 2 and the workpiece 15 to produce electroerosive discharges in the gap thereacross, the series circuit of the transducer 25 and the inductor 28 is brought into the resonant condition. The transducer 25 energized by the resonant current generates a high-frequency vibration which, intensified by the horn 26, is applied to the wire 1 at the guide portion 27. The circuit parameters of transducer 25 and inductor 28 are adjusted to resonate them with a high-frequency component of or contained in the gap discharge current to obtain a desired high-frequency signal in the range between 1 and 200 kHz which is carried and propagated by the traveling wire 1. The result is a transverse undulating motion of the wire stretch 1a at the high frequency with a plurality of nodes and loops at the machining guide 2.

The vibration of the wire 1 offers diverse advantageous effects in the machining zone of the present system. It serves to enhance the removal of chips and gases produced in machined recesses, to facilitate fluidity of the machining medium and to break away an arc discharge and short-circuiting that may occur. Furthermore, the formation and continuous travel of the multiple nodes and loops in the wire stretch 1 facilitate equalized and dispersive production of electrical discharges over the entire juxtaposed electrode and workpiece surfaces, thereby permitting surface finish to be improved and removal rate and machining efficiency to be increased. The enhanced chip removal or gap clarification and minimization of arc or short-circuiting damage render the fine wire electrode less susceptible of breakage and thus enhances machining stability and performance.

An improvement in removal rate and machining efficiency also results from the superimposition of the resonant energy furnished by the equivalent capacitance of the transducer 25 and the inductor 28 upon the source energy furnished by the power supply 23 for machining discharges.

The inductor 28 may also be additionally energized by an external high-frequency power supply to cause the transducer 25 to be vibrated with stability and with an increased effect of imparting the vibration to the wire 1.

The use of a vibratory resonant circuit 25, 28 as illustrated gives, however, distinct advantages over the external signal supply. Since the vibration generated is synchronous with machining discharges and related in energy to the machining discharges, its mode is held optimum adaptively depending upon machining conditions.

Figure 9:
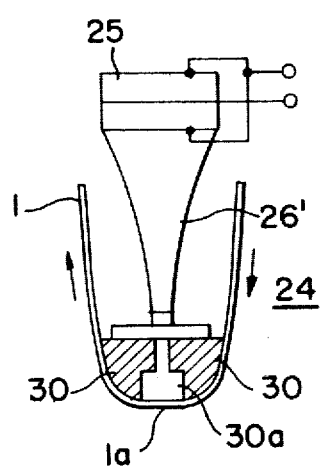
FIGS. 9 to 11 are elevational views of further various forms of the wire guide means of a tool head in accordance with the present invention, each guide member having a vibrator associated therewith in various forms.
Figure 10:
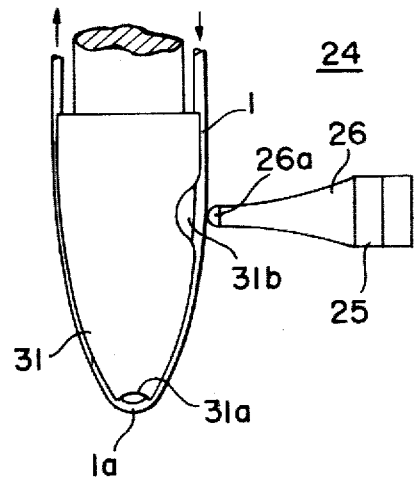

FIG. 9 shows a modification of the vibrator assembly 24 in which the vibratile horn 26 energized by the transducer 25 as described is held in engagement with a machining guide 30 e.g. sapphire, fixed to the tool head 3 for guiding the wire 1 along a U-shaped path. The vibration applied to the guide member 30 is transmitted to the wire 1. The guide member 30 is formed on its tip portion with a recess 30a so that the wire stretch 1a travelling thereover is freely vibrated In a modification shown in FIG. 10, a guide member 31 for guiding the wire 1 thereover in a U-shaped path is also formed at its inlet side with a recess 31b and the end 26a of the forn 26 is held in engagement with the wire 1a travelling over the recess 31a. In this system, a high-frequency vibration imparted to the wire 1 at the recess 31b is transmitted to permit the wire stretch 1a over the recess 31a to be freely vibrated.

Figure 11:
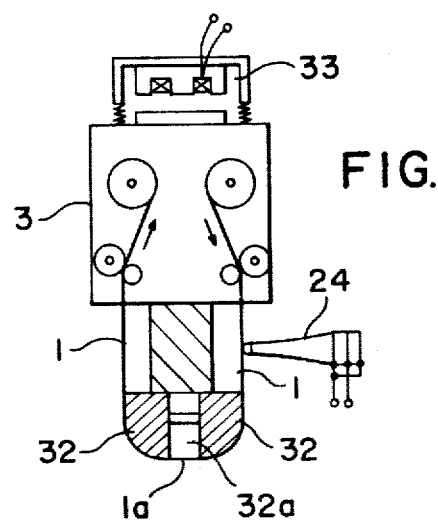

In FIG. 11 there is shown a further embodiment of the vibrator assembly according to the present invention in which the electrode system is subjected simultaneously to a multiple modes of vibration. In this case, a high-frequency vibration of a frequency in the range between 10 and 200 kHz is applied directly to the wire 1 by the assembly 24 in any of the manners described in connection with FIGS. 8, 9 and 10 to cause the wire stretch 1a traveling over the recess 32a formed at the end of the guide member 32 to be freely vibrated at the high-frequency while a low-frequency vibration of a frequency in the range between 50 and 500 Hz is imparted by an auxiliary vibrator 33 to the tool head 3 which carries at its end to guide member 32. The low-frequency vibration is therefore transmitted to the wire stretch 1a where it is superimposed upon the high-frequency vibration. Here, the low-frequency vibration is preferably of a greater amplitude than the high-frequency vibration.

It should be noted that the vibration may alternatively or additionally be applied on the side of the workpiece and also indirectly to the wire through the electrical machining liquid to the machining zone via, say, a nozzle 35 (FIG. 8). Furthermore, these different manners of vibration may be utilized in a desired combination.

The vibration arrangement associated in any of the forms hereinbefore described with the 3D wire-tool head assures a stabilized machining operation. The 3D scanning head with a guide assembly having nonconductive grooved wire-guiding surfaces so that the substantial portion of the wire continuously runningly supported thereover permits of the formation of substantially any patterned surface contour on a workpiece as desired at a high stock removal and with an increased efficiency viz. more readily, economically and effectively than conventional sinking-type electrical machining heads utilizing a solid, three-dimensional shaped electrode. Here, with the wire electrode surface successively renewed by continuous transportation, the wear thereon is effectively compensated for to make deformation immaterial, desired surface patterns are obtained with a satisfactory high precision.

It should be noted that the resonant-circuit arrangement shown in FIG. 8 for generating a high-frequency vibration allows, of course, parallel connection across the machining gap between the workpiece 15 and the wire electrode 1. The inductor in the vibrating assembly 24 can also be connected with an external capacitor to form a resonant circuit which may be connected to the gap either in series or in parallel with the source 23. The use of a capacitance or inductance possessed by the vibrator 24 to constitute a resonant circuit is particularly advantageous in simplifying the equipment.

A further or alternative form of vibrator assembly 24 may be used which utilizes electromagnetic induction. The machining current passing through the wire 1 may then be used and interacted with an external magnetic field to cause the wire 1 to be vibrated. The external magnetic field may be produced by a resonant circuit constituted by a field generating coil and an external capacitor.

The invention can be employed in conjunction with a diverse range of machining operations employing EDM, ECM or ECDM.

What is claimed is:

1. An electrical machining apparatus for forming a three-dimensional surface contour in a workpiece, comprising:
    a continuous elongate electrode;
    electrode advancing means for axially advancing said electrode from a supply means to a takeup means;
    a workpiece support for carrying said workpiece;
    electrode guide means carried by a tool head and formed with an arcuate wire-reception groove having an electrically nonconductive wire-guiding surface for guiding said axially advancing electrode under tension so that a portion of said electrode guided on said electrically nonconductive wire-guiding surface is exposed from said wire-reception groove and positioned in a machining relationship with a portion of said workpiece;
    power supply means for electrically energizing said electrode and said workpiece to electroerosively remove material from said portion of said workpiece;
    and machining feed means for relatively displacing tool head and said workpiece support so as to cause said electrode advanced over said guide means to sweep in a scanning manner over a predetermined machining path to form said three-dimensional surface contour therein.

2. The apparatus defined in claim 1 wherein said machining feed means includes
    first drive means for displacing said tool head along a Z-axis,
    second drive means for displacing said workpiece support in an X-Y plane orthogonal to said Z-axis, and
    control means for furnishing said first and second drive means with first and second drive signals, respectively, to cause said electrode to sweep in said scanning manner along said predetermined machining path in X-Y-Z coordinate system.

3. The apparatus defined in claim 2 wherein said machining feed means further includes third drive means furnished with a third drive signal from said control means for rotating said tool head about an axis coincident with or parallel to said Z-axis.

4. The apparatus defined in claim 3 wherein said machining feed means further includes fourth drive means furnished with a fourth drive signal from said control means for tilting said tool head about said axis relative to said X-Y plane.

5. The apparatus defined in claim 1, further comprising means for imparting a vibration to said elongate electrode advancing over said guide means so that a stretch of the elongate electrode traveling in the region of said groove has a transverse undulating motion with a plurality of nodes and loops along the electrode axis.

6. The apparatus defined in claim 5 wherein said vibration-imparting means comprises a resonant circuit connected to said power supply means and to a machining gap formed between said electrode and said workpiece.

7. The apparatus defined in claim 5 wherein said vibration-imparting means is adapted to vibrate said elongate electrode at a frequency in the range between 10 and 200 kHz.

8. The apparatus defined in claim 7, further comprising means for imparting a low-frequency vibration of a frequency in the range between 50 and 500 Hz to said tool head.

* * * * *